US008838921B2

(12) United States Patent
Harris, Jr. et al.

(10) Patent No.: US 8,838,921 B2
(45) Date of Patent: *Sep. 16, 2014

(54) DETERMINING WHETHER TO EXTEND A DRAIN TIME TO COPY DATA BLOCKS FROM A FIRST STORAGE TO A SECOND STORAGE

(75) Inventors: Theodore T. Harris, Jr., Tucson, AZ (US); Paul A. Jennas, II, Tucson, AZ (US); Jason L. Peipelman, Vail, AZ (US); Joshua M. Rhoades, Idaho Falls, ID (US); Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/474,081

(22) Filed: May 17, 2012

(65) Prior Publication Data

US 2012/0254568 A1    Oct. 4, 2012

Related U.S. Application Data

(63) Continuation of application No. 12/948,652, filed on Nov. 17, 2010.

(51) Int. Cl.
*G06F 12/16* (2006.01)
*G06F 12/00* (2006.01)
*G06F 3/06* (2006.01)
*G06F 11/34* (2006.01)
*G06F 11/20* (2006.01)

(52) U.S. Cl.
CPC ............ *G06F 3/065* (2013.01); *G06F 11/3485* (2013.01); *G06F 3/0619* (2013.01); *G06F 3/067* (2013.01); *G06F 11/2064* (2013.01); *G06F 11/3409* (2013.01); *G08F 3/0611* (2013.01); *G06F 11/2071* (2013.01)
USPC ............. 711/162; 711/E12.001; 711/E12.103

(58) Field of Classification Search
None
See application file for complete search history.

(56) References Cited

U.S. PATENT DOCUMENTS 7,171,583 B2    1/2007   Werner
2006/0106747 A1 *  5/2006   Bartfai et al. ..................... 707/1

(Continued)

OTHER PUBLICATIONS

"GMIR Consistency Group Formation—Surrender Mechanism", iP.com prior art database, IP.com document No. IPCOM001927247D, Jun. 29, 2010, pp. 1-3.

(Continued)

*Primary Examiner* — Denise Tran
(74) *Attorney, Agent, or Firm* — David W. Victor; Konrad Raynes Davda & Victor LLP

(57) ABSTRACT

Provided are a computer program product, system, and method for determining whether to extend a drain time to copy data blocks from a first storage to a second storage. A data structure indicates data blocks in the first storage to copy to the second storage. A drain operation copies the data blocks indicated in the first storage to the second storage for a drain time period. Write requests to the data blocks indicated in the data structure are queued during the drain time period, wherein the queued write requests are not completed while queued. Metric information based on the writes that occur to data blocks in the first storage are gathered during the drain time period; and in response to expiration of the drain time period, a determination is made from the gathered metric information of whether to continue the drain operation or terminate the drain operation.

11 Claims, 6 Drawing Sheets

(56) References Cited

U.S. PATENT DOCUMENTS

| | | | |
|---|---|---|---|
| 2007/0130213 A1* | 6/2007 | Jean-Denis et al. | 707/200 |
| 2008/0010424 A1 | 1/2008 | Morita | |
| 2012/0078848 A1* | 3/2012 | Jennas et al. | 707/649 |
| 2012/0124308 A1* | 5/2012 | Harris et al. | 711/162 |

OTHER PUBLICATIONS

U.S. Appl. No. 12/948,652, filed Nov. 17, 2010, entitled "Determining Whether to Extend a Drain Time to Copy Data Blocks From a First Storage to a Second Storage", by inventors T.T. Harris, Jr., P.A. Jennas, II, J.L. Peipelman, J.M. Rhoades, M.J. Ward.

Preliminary Amendment filed May 17, 2012, pp. 1-10, for U.S. Appl. No. 12/948,652, filed Nov. 17, 2010, entitled "Determining Whether to Extend a Drain Time to Copy Data Blocks From a First Storage to a Second Storage", by inventors T.T. Harris, Jr., P.A. Jennas, II, J.L. Peipelman, J.M. Rhoades, M.J. Ward.

Office Action dated Jun. 13, 2013, pp. 18, for U.S. Appl. No. 12/948,652, filed Nov. 17, 2010, by inventors T.T. Harris, Jr.,et al.

Response dated Aug. 15, 2013, pp. 12, to Office Action dated Jun. 13, 2013, pp. 18, for U.S. Appl. No. 12/948,652, filed Nov. 17, 2010, by inventors T.T. Harris, Jr.,et al.

Office Action dated Nov. 18, 2013, pp. 7, for U.S. Appl. No. 12/948,652, filed Nov. 17, 2010.

Notice of Allowance dated May 6, 2014, pp. 21, for U.S. Appl. No. 12/948,652, filed Nov. 17, 2010.

* cited by examiner

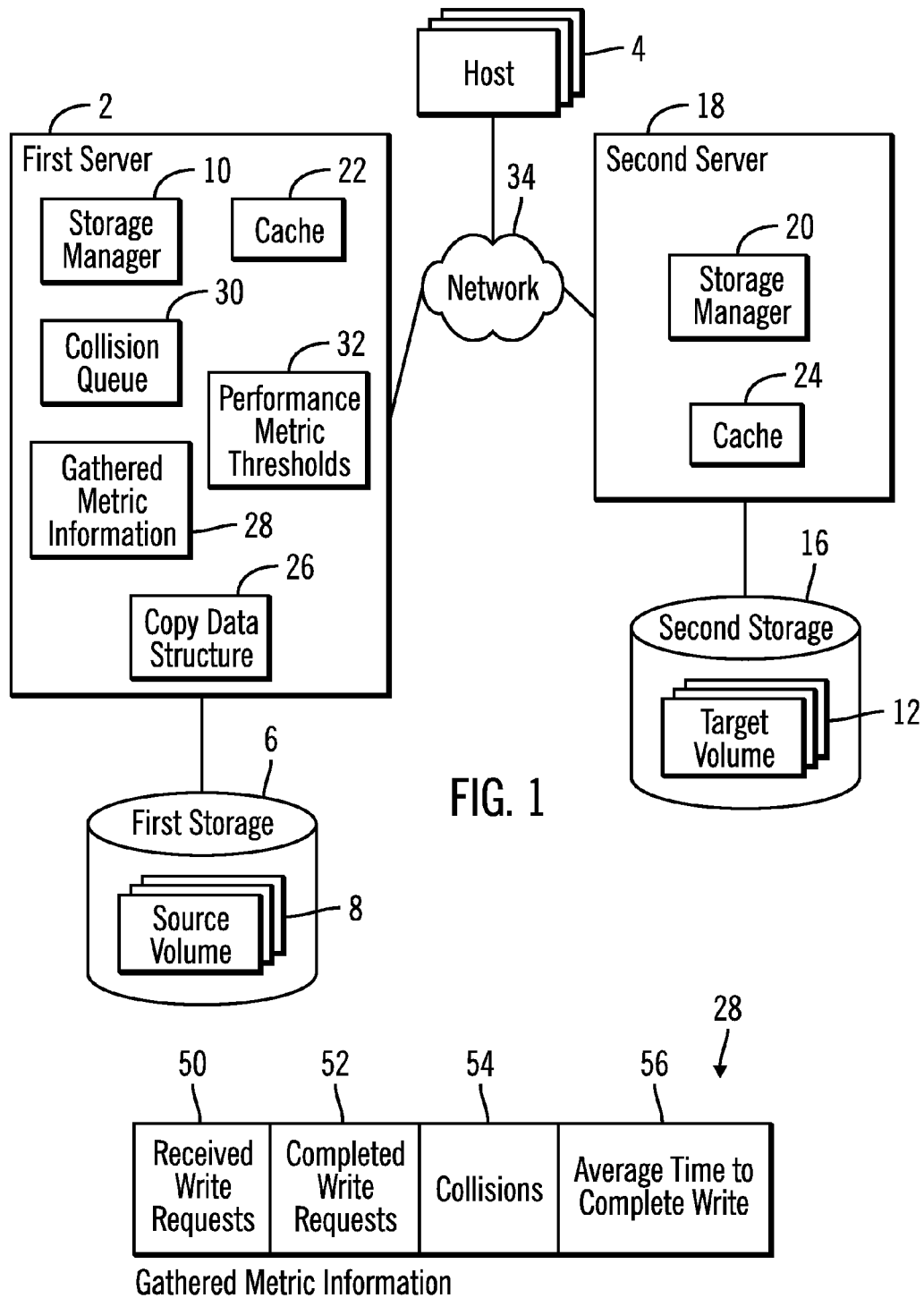

DETERMINING WHETHER TO EXTEND A DRAIN TIME TO COPY DATA BLOCKS FROM A FIRST STORAGE TO A SECOND STORAGE

CROSS-REFERENCE TO RELATED APPLICATION

This application is a continuation of U.S. patent application Ser. No. 12/948,652, filed Nov. 17, 2010, which application is incorporated herein by reference in its entirety.

BACKGROUND OF THE INVENTION

1. Field of the Invention

The present invention relates to a computer program product, system, and method for determining whether to extend a drain time to copy data blocks from a first storage to a second storage.

2. Description of the Related Art

Disaster recovery systems typically address two types of failures, a sudden catastrophic failure at a single point-in-time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. Different copy technologies may be used for maintaining remote copies of data at a secondary site, such as International Business Machine Corporation's ("IBM") Extended Remote Copy (XRC), Coupled XRC (CXRC), Global Copy, and Global Mirror Copy.

In data mirroring systems, data is maintained in volume pairs. A volume pair is comprised of a volume in a primary storage device and a corresponding volume in a secondary storage device that includes an identical copy of the data maintained in the primary volume. Primary and secondary servers may be used to control access to the primary and secondary storage devices. In certain data mirroring systems, a timer is used to provide a uniform time across systems so that updates written by different applications to different primary storage devices use consistent time-of-day (TOD) value as a time stamp. The host operating system or the application may time stamp updates to a data set or set of data sets when writing such data sets to volumes in the primary storage. The integrity of data updates is related to insuring that updates are done at the secondary volumes in the volume pair in the same order as they were done on the primary volume. The time stamp provided by the application program determines the logical sequence of data updates.

In many application programs, such as database systems, certain writes cannot occur unless a previous write occurred; otherwise the data integrity would be jeopardized. Such a data write whose integrity is dependent on the occurrence of a previous data write is known as a dependent write. Volumes in the primary and secondary storages are consistent when all writes have been transferred in their logical order, i.e., all dependent writes transferred first before the writes dependent thereon. A consistency group has a consistency time for all data writes in a consistency group having a time stamp equal or earlier than the consistency time stamp. A consistency group is a collection of updates to the primary volumes such that dependent writes are secured in a consistent manner. The consistency time is the latest time to which the system guarantees that updates to the secondary volumes are consistent. Consistency groups maintain data consistency across volumes and storage devices. Thus, when data is recovered from the secondary volumes, the recovered data will be consistent.

One technique to provide a consistent point-in-time copy of data is to suspend all writes to the primary storage and then while writes are suspended copy all the data to mirror to the secondary storage or backup device. A disadvantage of this technique is that host writes are suspended for the time to create a point-in-time copy of data, which may adversely effect application processing at the host. An alternative technique is to establish a logical copy of data at the primary storage, which takes a very short period of time, such as no more than a second or two. Thus, suspending host writes to the primary storage during the time to establish the logical copy is far less disruptive to host application processing than would occur if host writes were suspended for the time to copy all the source data to the target volume. After establishing the logical copy, source volume data subject to an update is copied to a target volume so that the target volume has the data as of the point-in-time the logical copy was established at the primary storage, before the update. This defers the physical copying until an update is received. This logical copy operation is performed to minimize the time during which the target and source volumes are inaccessible.

To drain or copy a consistency group of data from a primary storage to a secondary storage, the primary system maintains indication of the blocks of data in the consistency group to drain. During the drain operation, host writes to the data being drained, also known as collisions, are delayed until the drain of that block completes. Thus, the drain operation may have a negative impact on host performance because the time to complete write requests is delayed. A drain time period may be set during which the data in the consistency group is copied to the secondary storage and host writes to the data not copied over, i.e., collisions, are queued and delayed. The drain operation is failed if the draining of all the data blocks in the consistency group is not completed within the drain time period. In such case, the operations to drain the consistency group must be performed again and subject to the same risk that the drain operation may not complete within the time provided for the drain operations.

There is a need in the art for improved techniques for draining data from a first storage to a second storage.

SUMMARY

Provided are a computer program product, system, and method for determining whether to extend a drain time to copy data blocks from a first storage to a second storage. A data structure is generated indicating data blocks in the first storage to copy to the second storage. A drain operation is initiated to copy the data blocks indicated in the first storage to the second storage for a drain time period. Write requests to the data blocks indicated in the data structure are queued during the drain time period, wherein the queued write requests are not completed while queued. Metric information based on the writes that occur to data blocks in the first storage are gathered during the drain time period; and in response to expiration of the drain time period, a determination is made from the gathered metric information of whether to continue the drain operation or terminate the drain operation.

BRIEF DESCRIPTION OF THE DRAWINGS

FIG. 1 illustrates an embodiment of a network computing environment.

FIG. 2 illustrates an embodiment of gathered metric information.

DETAILED DESCRIPTION

Figure 3A:
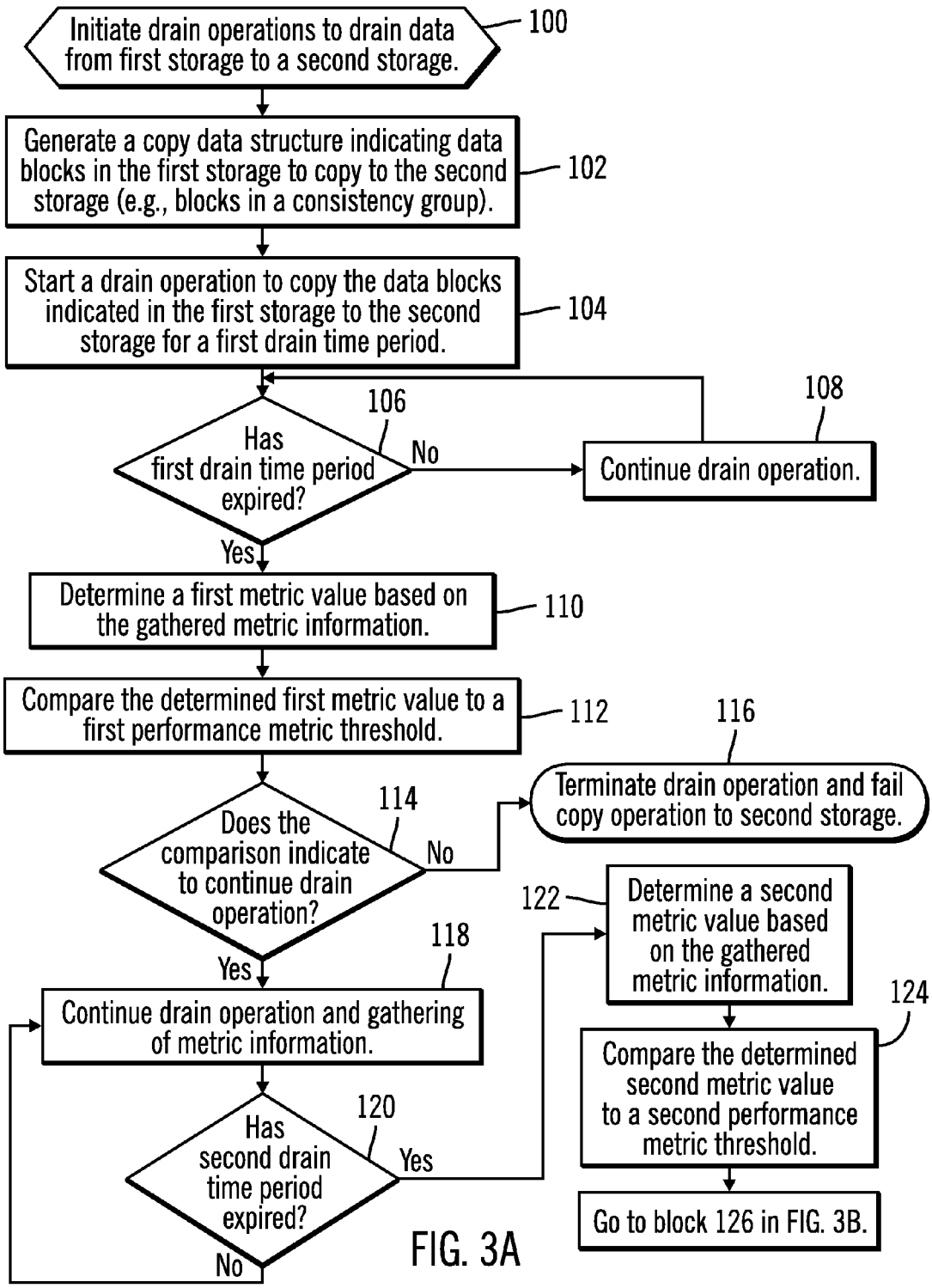
FIGS. 3A and 3B illustrate an embodiment of operations to drain data from a first storage to a second storage.

FIG. 1 illustrates an embodiment of a network computing environment. A first server 2 manages Input/Output (I/O) requests from one or more host systems 4 to a primary storage 6 in which storage volumes 8, referred to as source volumes 8, are configured. The first server 2 includes a storage manager 10 program that manages I/O requests to the primary storage volumes 8 and may mirror updates to source volumes 8 to target volumes 12 in a secondary storage 16. A second server 18 includes a storage manager 20 program to manage I/O access to the second storage 16 and management communication with the first server 2.

The first 2 and second 18 servers include a cache 22 and 24, respectively, to buffer read and write data to their corresponding storage 6 and 16. Both the first 2 and second 18 servers may receive read and write requests from host systems 4.

The primary storage manager 10 may form a consistency group of updates in the source volume 8 to copy to the target volume 12 that are consistent as of a point-in-time. To copy the consistency group of updates to the secondary storage 8, the storage manager 10 maintains a copy data structure 26 indicating data blocks in the consistency group in the source volume 8 (first storage 6) to copy to the target volume 10 (second storage 16). The storage manager 10 initiates a drain operation to copy or drain updates in the consistency group indicated in the copy data structure 26 to the target volume 10. During the drain operation, the storage manager 10 queues host updates to data blocks indicated in the copy data structure 26 as not copied to the target volume 10 in a collision queue 30. The storage manager 10 gathers metric information 32 on write performance while draining data in the copy data structure 26 to the target volume 10.

In one embodiment, the copy data structure 26 may comprise a bitmap having an entry for each block in the consistency group or other group to copy, where one bit value indicates the block has not been copied to the second storage 16 and the other bit value indicates the block has been copied. The drain operation is performed during a drain time period, during which host 4 writes to the data blocks being drained are queued in the collision queue 30. The storage manager 10 uses performance metric thresholds 32 to determine whether to extend the drain time of the drain operation during which host 4 updates to data being drained are queued. The determination of whether to extend the drain time period may be based on balancing the affects on host performance that occur from collisions, i.e., delaying processing of write requests to data that has not yet been drained, with the goal of completing the drain operation. The data being drained may be part of a consistency group or may comprise another grouping of data not part of a consistency group.

FIG. 2 illustrates an embodiment of the gathered metric information 28 during the drain operation, which may include a number of received write requests 50 (to data being drained and data not subject to draining), completed write requests 52, collisions 54 (i.e., host 4 updates directed to data blocks indicated in the copy data structure 26 as not copied to the target volume 12), and an average time to complete write requests 56. The metric information 50, 52, 54, and 56 may be updated during the drain operations. In certain embodiments, the metric information 28 may include some or all of the metric information 50, 52, 54, and 56 and additional metric information gathered during the drain operation.

In one embodiment, the performance metric threshold 32 may indicate a collision ratio threshold of collisions to write requests, such that if the actual collision ratio as indicated in the gathered metric information 28 is below the threshold, then the drain operation may continue. In this case, the drain operation is not significantly impacting host I/Os because host update collisions are low. Alternatively, the performance metric threshold 32 may indicate an average write time. In such case, if the time to complete writes, as indicated in the gathered metric information 28, is below the average write time threshold, then the drain operation may continue because the drain operation is not resulting in write completion time exceeding a threshold.

In a yet further embodiments, the performance metric threshold 32 indicates a collision threshold and a blocks-to-drain threshold, such that if the actual collisions are below the threshold and the remaining blocks-to-drain are low, then the drain operation may continue. In this case, host impact is not significant as indicated by the relatively low collisions and the drain operation is close to completion, as indicated by the remaining blocks-to-drain.

In certain embodiments, the performance metric thresholds 32 may include e different thresholds to apply at the end of different drain time periods to dynamically alter the determinations made to continue drain operations as the duration of the drain operation is extended. For instance, the thresholds applied later on during the draining process to determine whether to continue draining may be more stringent, such as requiring a lower collision ratio, then the thresholds used early in the drain process. The actual performance metric thresholds may be determined by empirical studies in a test environment.

The first 2 and second 18 servers and host 4 may communicate over a network 34. The network 34 may comprise a Storage Area Network (SAN), Local Area Network (LAN), Intranet, the Internet, Wide Area Network (WAN), peer-to-peer network, wireless network, arbitrated loop network, etc. The servers 2 and 18 may comprise an enterprise storage server, storage controller, blade server, general purpose server, desktop computer, workstation, telephony device, personal digital assistant (PDA), etc., or other device used to manage I/O requests to attached storage systems 6a, 6b, 6c. The storages 6 and 16 may each comprise storage media implemented in one or more storage devices known in the art, such as interconnected hard disk drives (e.g., configured as a DASD, RAID, JBOD, etc.), magnetic tape, solid state storage devices (e.g., EEPROM (Electrically Erasable Programmable Read-Only Memory), flash memory, flash disk, storage-class memory (SCM)), electronic memory, etc. The servers 2 and 18 and storages 6 and 16 may be implemented in a distributed storage environment or network storage environment, such as "cloud" storage. The volumes configured in the storage systems may comprise a logical arrangement of tracks or blocks of data.

The storage managers 10 and 20 may be implemented as one or more software programs loaded into a memory and executed by processors in the severs 6 and 18. In an alternative embodiment, the storage managers 10 and 20 may be implemented with hardware logic, such as an Application Specific Integrated Circuit (ASIC), or as a programmable processor executing code in a computer readable storage medium.

Figure 3B:
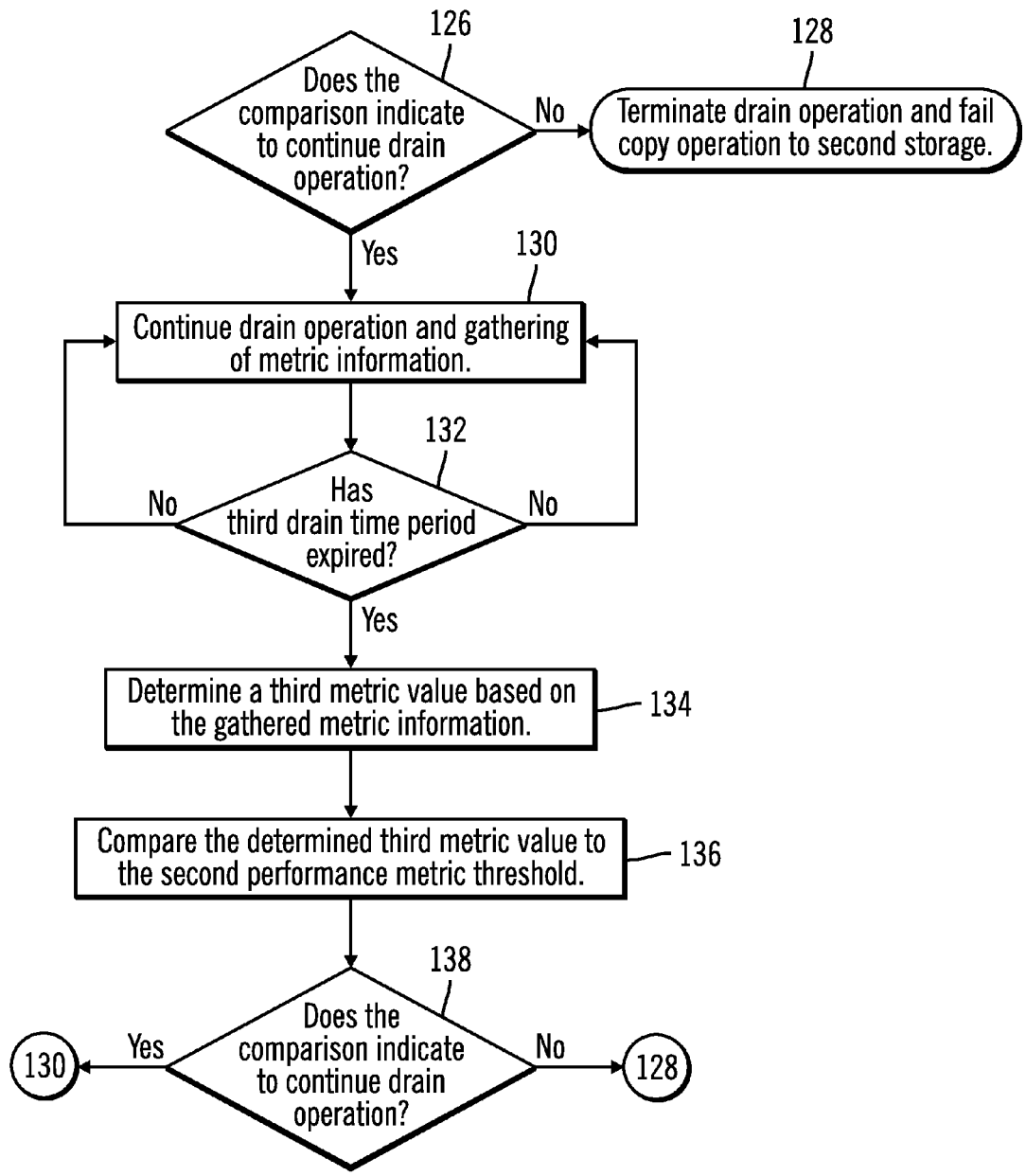

FIGS. 3A and 3B illustrate operations performed by the storage manager 10 to drain the data blocks indicated in the copy data structure 26 to the second storage 16. Upon initiating (at block 100) the drain operations, the storage manager 10 generates (at block 102) a copy data structure 26 indicating data blocks in the first storage 6 to copy to the second storage 16, which may comprise updated data in the source volume 8 in a consistency group to copy a consistency group of data consistent as of a point-in-time to the second storage 16, or may comprise data not in a consistency group. The storage manager 10 starts (at block 104) drain operations to copy the data blocks indicated in the copy data structure 26 in the first storage to the second storage for a first drain time period. If (at block 106) the first drain time period has not expired, then the storage manager 10 continues (at block 108) the drain operation to copy data blocks indicated in the copy data structure 26 to the second storage 16. When the first drain time period expires (from the yes branch of block 106), then the storage manager 10 determines (at block 110) a first metric value based on the gathered metric information 18, such as a first collision ration, first average write completion time, first remaining blocks-to-drain and first number of collisions, etc. The storage manager 10 compares (at block 112) the determined first metric value to a first performance metric threshold in the thresholds 32, such as by comparing the determined collision ratio to a first collision ratio threshold, comparing a determined average write request completion time to a first threshold, comparing the determined remaining blocks-to-drain and number of collisions to thresholds, etc.

If (at block 114) the comparison indicates to not continue the operation, such as if the determined collision ratio is above a collision threshold, i.e., too many collisions, then the storage manager 10 terminates (at block 116) the drain operation and fails the copy operation to second storage 16. In this way, the copying of the consistency group fails and has to be retried because operating conditions, such as collisions, average write request completion time, etc., indicate that the burdens on host performance outweigh the advantages of completing the drain operation, so the drain operation is terminated. If (from the yes branch at block 114) the comparison indicates to continue the drain operation, then the storage manager 10 continues (at block 118) draining data indicated in the copy data structure 26 and gathering metric information 28 for a second drain time period. During the second drain time period, the drain operations continue (from the no branch of block 120). When the second drain time period expires (from the yes branch of block 120), the storage manager 10 determines (at block 122) a second metric value based on the gathered metric information 26, such as a second collision ratio, a second average write completion time, second remaining blocks-to-drain and second number of collisions, etc. The determined second metric value is compared (at block 124) to a second performance metric threshold. In one embodiment, the second performance metric threshold may be more stringent or different than the first performance metric threshold, such as a lower collision ratio threshold, lower average write completion time threshold, lower remaining blocks-to-drain threshold, lower number of collisions thresholds, such that the measured metric value has to indicate even lower burdens on the hosts in order to continue the drain operation for an even longer period of time.

With respect to FIG. 3B, if (at block 126) the comparison indicates to not continue the operation, such as if the determined second collision ratio is above a second collision threshold, i.e., too many collisions, then the storage manager 10 terminates (at block 128) the drain operation and fails the copy operation to second storage 16. If (from the yes branch at block 126) the comparison indicates to continue the drain operation, then the storage manager 10 continues (at block 130) draining data indicated in the copy data structure 26 and gathering metric information 28 for a third drain time period. During the third drain time period, the drain operations continue (from the no branch of block 132). When the third drain time period expires (from the yes branch of block 132), the storage manager 10 determines (at block 134) a third metric value based on the gathered metric information 26, such as a third collision ratio, a third average write completion time, third remaining blocks-to-drain, third number of collisions, etc. The determined third metric value is compared (at block 136) to a second (or third or other) performance metric threshold. If (at block 138) the comparison indicates to continue the drain operation, i.e., the determined metric falls below the threshold, then control proceeds back to block 130 to continue the drain operation. Otherwise, if (from the no branch of block 138) the comparison indicates that the drain operation is not continue, then control proceeds back to block 128 to terminate the drain operation.

In one embodiment, once the third drain time period expires, the drain operation will terminate if not completed. In an alternative embodiment, the drain operation may continue to perform iterations based on the comparison at block 138 after each drain time period expires until completion of the drain operation if the measured performance metrics fall below the thresholds, indicating that the burdens on the hosts due to the drain operations are not sufficiently significant to outweigh the goal of completing the drain operation. In one embodiment, the second performance metric threshold may be used continually for all checks after the second check. In alternative embodiments, the performance metric threshold used for subsequent checks may change each time. In an alternative embodiment, the first and second performance metric thresholds may comprise the same value, such that the threshold remains constant through all checks on whether to continue with the drain operation. The time periods may comprise several seconds.

In an embodiment where the gathered metric information comprises a number of collisions and number of write requests and the performance metric thresholds comprise collision ratio thresholds, i.e., the ratio of collisions to write requests, then the drain operation continues if the measured collision ratio is less than the threshold used during the checks at blocks 114, 126, and 138, and fails if the measured collision ratio is above the one or more thresholds used, indicating that there is an unacceptably high ratio of collisions adversely affecting host performance. In certain embodiments, the second collision ratio threshold using during a check after the first check, such as at blocks 126 and 138 in FIG. 3B, is lower than the first collision ration threshold used, thus requiring that collisions and effect on host 4 performance be even less to further continue the drain operation, such as in FIG. 3B.

In further embodiments, the gathered metric information comprises an average write completion time that is calculated as writes to data blocks, indicated in the copy data structure 26 and not indicated in the copy data structure 26. The drain operations continue if the measured average write completion time is less than the threshold used during the checks at blocks 114, 126, and 138 and fails if the measured write completion time is above the one or more thresholds used, indicating that write completion time is unacceptably high and negatively impacting host 4 performance. In certain embodiments, the second write completion time threshold using during a check after the first check, such as at blocks 126 and 138 in FIG. 3B, is lower than the first write completion time threshold used, thus requiring that write time completion and effect on host 4 performance be even less to further continue the drain operation, such as in FIG. 3B.

In a further embodiment, the gathered metric information may comprise a number of collisions and the remaining blocks-to-drain, as indicated in the copy data structure 26. In such case, the drain operation continues if the measured number of collisions is less than a collision number threshold and the remaining blocks-to-drain is below a blocks-to-drain threshold used during the checks at blocks 114, 126, and 138. The drain operation fails if the measured number of collisions and blocks-to-drain metrics are above the thresholds, indicating that the negative impact on host performance, as indicated by the number of collisions exceeding the threshold, is unacceptably high, and that the benefit of continuing the drain operation is limited because the drain operation is not close to completion, i.e., the remaining blocks-to-drain exceeds the threshold. In certain embodiments, the second collision number and blocks-to-drain thresholds used during a check after the first check, such as at blocks 126 and 138 in FIG. 3B, is lower than the first thresholds, thus requiring that the effect on host performance, as indicated by the number of collisions, and closeness to completing the drain, as indicated by the remaining blocks-to-drain, is even less than before to further continue the drain operation, such as in FIG. 3B.

Figure 4:
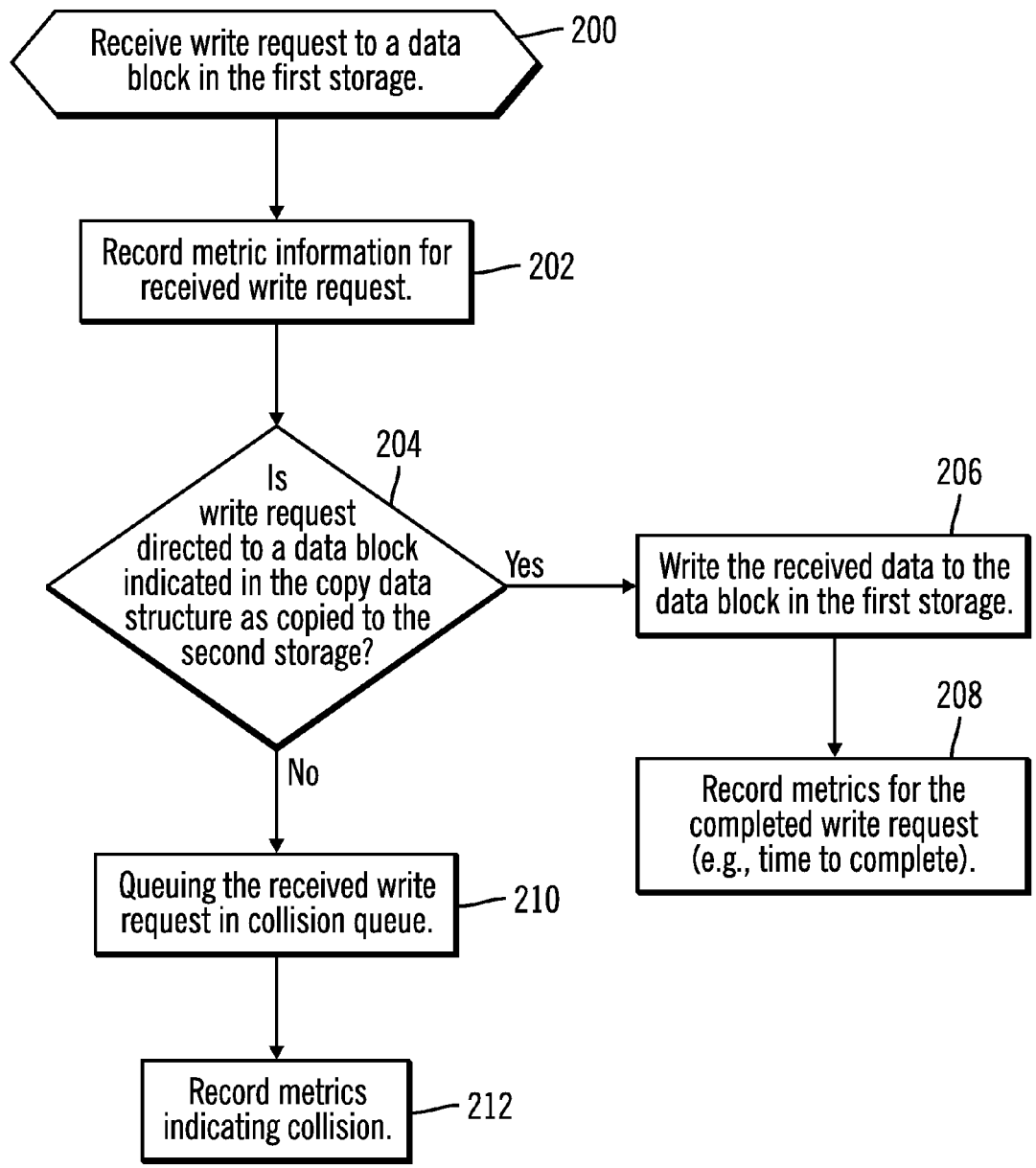
FIG. 4 illustrates an embodiment of operations to process a write request to the first storage.

FIG. 4 illustrates an embodiment of operations performed by the storage manager 10 to process a received write request to a data block in the first storage 6. Upon receiving (at block 200) the write request, the storage manager 10 records (at block 202) metric information 28 for the received write request, such as indicating that a write request was received and the start time of receiving the write request. If (at block 204) the write request is directed to a data block indicated in the copy data structure 26 as copied to the second storage 16, then the storage manager 10 writes (at block 206) the received data to the data block in the first storage 26 and records (at block 208) metrics for the completed write request, such as the time to complete the write request. If (at block 204) the write request is to a data block indicated in the copy data structure 26 as not copied, i.e., not drained, to the second storage 16, then there is a collision and the storage manager 10 queues (at block 210) the received write request in the collision queue 30 and records (at block 212) metrics indicating the collision.

Figure 5:
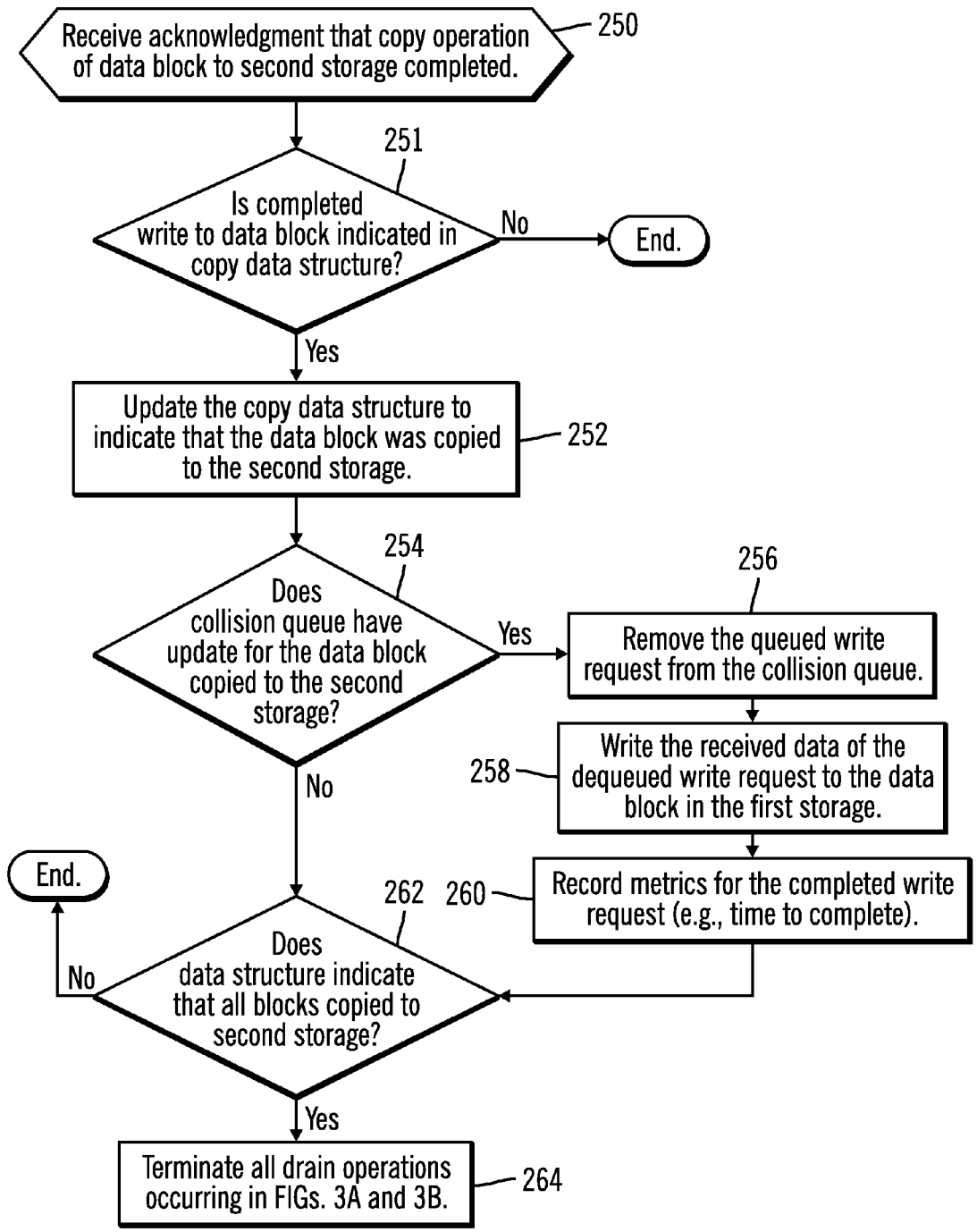
FIG. 5 illustrates an embodiment of operations to process an acknowledgment that a data block was successfully copied from the first storage to the second storage.

FIG. 5 illustrates an embodiment of operations performed by the storage manager 10 to process an acknowledgement from the second server 18 that the data block was successfully copied to the second storage 16. Upon receiving (at block 250) the acknowledgment that the copy operation of the data block to the second storage 16 completed, if (at block 251) the completed write was not being drained, i.e., not indicated in the copy data structure 26, then control ends. Otherwise, if (at block 251) the completed write is to a data block indicated in the copy data structure 26, then the storage manager 10 updates (at block 252) the copy data structure 26 to indicate that the data block was copied to the second storage 16. If (at block 254) the collision queue 30 includes an update for the data block acknowledged as copied to the second storage 16, then that queued write operation can be completed. In such case, the storage manager 10 removes (at block 256) the queued write request from the collision queue 30 and writes (at block 258) the received data of the dequeued write request to the data block in the first storage 6. Metrics for the completed write, such as the time to complete, are recorded (at block 260). If the completed write is not for a block subject to a write request in the collision queue 30 (from the no branch of block 254) or after the queued write is applied (from block 260), the storage manger 10 determines (at block 262) whether the copy data structure 26 indicates that all blocks have been copied to the second storage 16. If so, then all drain operations occurring in FIGS. 3A and 3B are terminated (at block 264) and control ends. If (at block 262) the drain operation is still ongoing, i.e., all blocks not yet copied to storage, then control ends.

In the described embodiments, the drain time may be adjusted during drain operations to take into account a collision ratio of collisions to write requests, the completion time of write requests, the number of write requests, and the remaining blocks-to-drain. In this way, if the current drain operations are not unduly affecting host performance, as indicated by comparing a measured performance metric to a performance metric threshold indicating a host performance impact, then the drain operation may continue. Otherwise, if the determined impact on host performance is unacceptable, then the drain operation may be terminated. Further, the described embodiments may factor in the amount of time remaining in the drain operation, such as if the number of blocks-to-drain is low, then the benefit of completing draining successfully may outweigh the impact of collisions on host performance for the relatively small amount of time needed to complete the relatively few number of blocks remaining to drain.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In certain embodiments, the system of FIG. 1 may be implemented as a cloud component part in a cloud computing environment. In the cloud computing environment, the systems architecture of the hardware and software components involved in the delivery of cloud computing may comprise a plurality of cloud components communicating with each other over a network, such as the Internet. For example, in certain embodiments, the first server of FIG. 1 may provide hosts and clients data mirroring services in a networked cloud.

Figure 6:
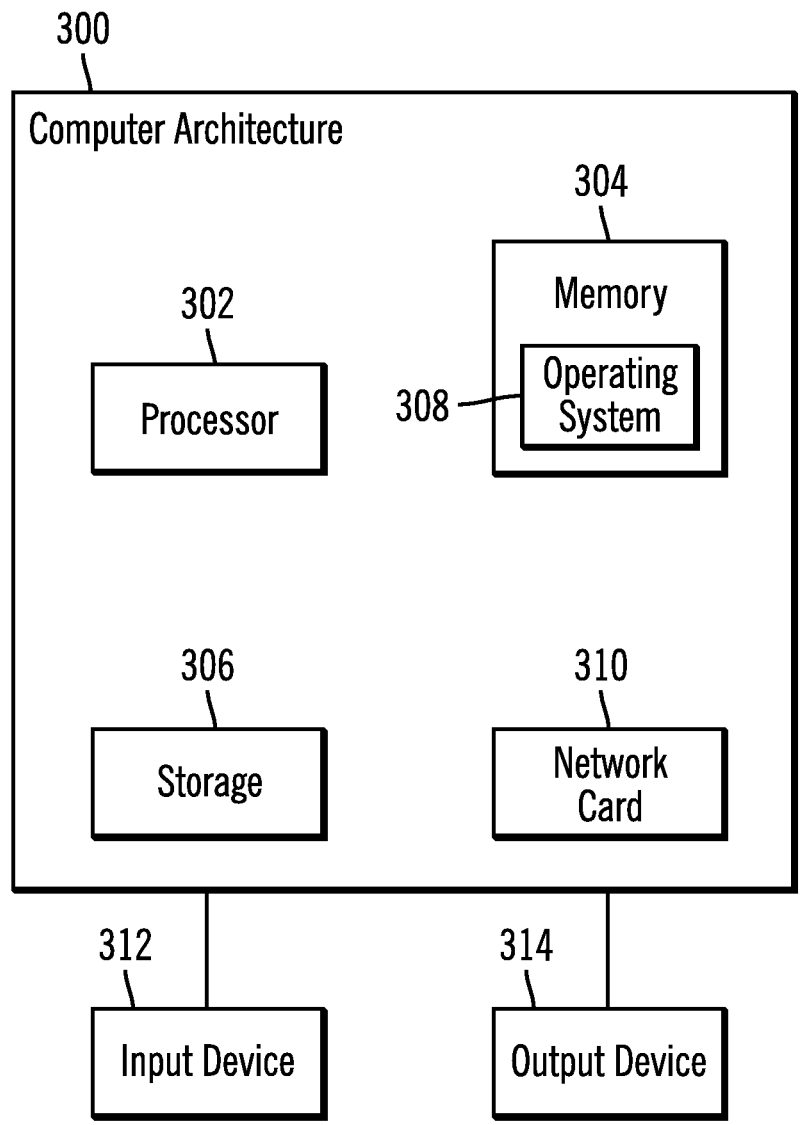
FIG. 6 illustrates an embodiment of a computer architecture.

FIG. 6 illustrates an embodiment of a computer architecture 300 that may be implemented at the servers 2 and 18 and hosts 4 in FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs, including an operating system 308 and the storage manager 10, 20, in the storage 306 are loaded into the memory 304 and executed by the processor 302. The memory 304 may further include the cache 20, 22, collision queue 30, performance metric thresholds 32, gathered metric information 28, and copy data structure 26. The architecture further includes a network card 310 to enable communication with the network 30. An input device 312 is used to provide user input to the processor 302, and may include a keyboard, mouse, pen-stylus, microphone, touch sensitive display screen, or any other activation or input mechanism known in the art. An output device 314 is capable of rendering information transmitted from the processor 302, or other component, such as a display monitor, printer, storage, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3A, 3B, 4, and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   generating a data structure indicating data blocks in a first storage to copy to a second storage;
   initiating a drain operation to copy the data blocks indicated in the first storage to the second storage for a drain time period;
   queuing write requests to the data blocks indicated in the data structure during the drain time period, wherein the queued write requests are not completed while queued;
   gathering metric information based on a number of collisions of the write requests, wherein collisions comprise write requests directed to data blocks being drained that are delayed until the blocks are copied; and
   gathering metric information based on a number of collisions of the write requests, wherein collisions comprise write requests directed to data blocks being drained that are delayed until the blocks are copied; and
   in response to expiration of the drain time period, determining from the gathered metric information whether to continue the drain operation or terminate the drain operation.

2. The method of claim 1, wherein the determining from the gathered metric information of whether to continue the drain operation comprises:
   providing a performance metric threshold;
   determining a metric value based on the gathered metric information; and
   comparing the determined metric value to the performance metric threshold to determine whether to continue the drain operation.

3. The method of claim 2, wherein the performance metric threshold comprises a first performance metric threshold, wherein the drain time period comprises a first drain time period, wherein the determined metric value comprises a first metric value, wherein the drain operation is continued for a second drain time period in response to the continuing of the drain operation, further comprising:
   continuing to gather metric information during the second drain time period;
   in response to the second drain time period expiring, determining a second metric value based on the gathered metric information; and
   comparing the determined second metric value to a second performance metric to determine whether to continue the drain operation.

4. The method of claim 3, until the drain operation has completed resulting in all the data blocks indicated in the data structure copied to the second storage, performing iterations of the following operations:
   continuing the drain operation for an additional drain time period in response to determining to continue the drain in response to comparing the second metric value or subsequently calculated additional metric value with the second performance metric;
   continuing to gather metric information during the additional drain time period;
   in response to the additional drain time period expiring before all the data blocks indicated in the data structure have been copied to the second storage, determining an additional metric value based on the gathered metric information;
   determining whether the determined additional metric value is less than the second performance metric threshold; and
   returning to the continuing of the drain operation for the additional time period.

5. The method of claim 2, wherein the gathered metric information indicates received write requests and collisions, wherein the performance metric threshold indicates a collision ratio threshold, wherein the determined metric value comprises a determined collision ratio of the number of collisions and number of received write requests indicated in the gathered metric information, and wherein the drain operation is continued in response to determining that the determined collision ratio is less than the collision ratio threshold.

6. The method of claim 5, wherein the collision ratio threshold comprises a first collision ratio threshold, wherein the drain time period comprises a first drain time period, wherein the determined collision ratio comprises a first collision ratio, wherein the drain operation is continued for a second drain time period in response to the continuing of the drain operation, further comprising:
   continuing to gather metric information indicating write requests received and write requests directed to data blocks indicated in the data structure as not copied to the second storage during the second drain time period;
   in response to the second drain time period expiring, determining a second collision ratio based on the gathered metric information;
   determining whether the determined second collision ratio is less than a second collision ratio threshold; and
   continuing the drain operation in response to determining that the determined second collision ratio is less than the second collision ratio.

7. The method of claim 6, wherein the second collision ratio threshold is less than the first collision ratio threshold.

8. The method of claim 2, wherein the gathered metric information indicates a time to complete received write requests, wherein the performance metric threshold indicates a write time threshold, wherein the determined metric value comprises a determined average write time based on the gathered metric information, further comprising:
   continuing the drain operation in response to determining that the determined average write time is less than the collision ratio; and terminating the drain operation in response to determining that the determined average write time is greater than the collision ratio.

9. The method of claim 2, wherein the gathered metric information indicates a number of blocks indicated in the data structure not yet copied to the second storage and the number of collisions, wherein the performance metric threshold indicates a collision number threshold and a blocks-to-drain threshold, wherein the determined metric value comprises a determined blocks-to-drain and determined number of collisions, further comprising:

continuing the drain operation in response to determining that the determined blocks-to-drain is less than the blocks-to-drain threshold and the determined number of collisions is less than the collision number threshold.

10. The method of claim 2, wherein the data blocks indicated in the data structure are part of a consistency group of updated data in the first storage consistent as of a point of time, further comprising:

in response to the comparing of the determined metric value to the performance metric threshold indicating to not continue the drain operation by performing:
terminating the drain operation; and
failing the copy operation of the data blocks indicated in the data structure from the first storage to the second storage.

11. The method of claim 1, further comprising:

updating the data structure to indicate that a data block indicated in the data structure was copied to the second storage in response to copying the data block from the first storage to the second storage;

determining whether a received write request is directed to a data block indicated in the data structure as not copied to the second storage, wherein the write request to the data block indicated in the data structure as not copied to the second storage is queued; and performing the write request to the data block in response to determining that the data structure does not indicate the data block as not copied to the second storage.

* * * * *